United States Patent
Ishizaki

(10) Patent No.: US 9,681,327 B2
(45) Date of Patent: *Jun. 13, 2017

(54) WIRELESS SENSOR NETWORK SYSTEM

(71) Applicant: HITACHI KOKUSAI ELECTRIC INC., Tokyo (JP)

(72) Inventor: Masayuki Ishizaki, Tokyo (JP)

(73) Assignee: HITACHI KOKUSAI ELECTRIC INC., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/156,677

(22) Filed: May 17, 2016

(65) Prior Publication Data

US 2016/0262040 A1    Sep. 8, 2016

Related U.S. Application Data

(63) Continuation of application No. 14/342,031, filed as application No. PCT/JP2012/063652 on May 28, 2012, now Pat. No. 9,398,485.

(30) Foreign Application Priority Data

Sep. 2, 2011 (JP) ................. 2011-191503

(51) Int. Cl.
*H04W 28/02* (2009.01)
*H04W 40/04* (2009.01)
(Continued)

(52) U.S. Cl.
CPC ......... *H04W 28/021* (2013.01); *H04W 4/005* (2013.01); *H04W 40/04* (2013.01);
(Continued)

(58) Field of Classification Search
CPC  H04L 67/1097; H04W 28/021; H04W 40/04; H04W 40/12; H04W 40/22; H04W 84/18; Y02B 60/50
(Continued)

(56) References Cited

U.S. PATENT DOCUMENTS

2009/0135843 A1* 5/2009 Veillette ................. G01D 4/004
                                                                  370/406
2011/0059691 A1* 3/2011 Hegge ................. H04W 52/267
                                                                  455/11.1
(Continued)

FOREIGN PATENT DOCUMENTS

JP    2001-237764 A    8/2001
JP    2002-026923 A    1/2002
(Continued)

OTHER PUBLICATIONS

International Search Report.

*Primary Examiner* — Mohammad Anwar
*Assistant Examiner* — Kokou R Detse
(74) *Attorney, Agent, or Firm* — Bacon & Thomas, PLLC

(57) ABSTRACT

A wireless sensor network system includes: sensor terminals and a management terminal. A sensor terminal sends a join request at a first transmission power; and the management terminal calculates the traffic load of nodes on the reception path of the join request. If the number of hops and the traffic load are both within respective permissible ranges, the management terminal sets the reception path as the communication route of the sensor terminal. If the number of hops and/or the load is not within the permissible rage, the management terminal reconstructs the communication path by outputting an instruction to the sensor terminal to make direct connection to the management terminal or a specified node with a low traffic load, at a second transmission power greater than the first transmission power. When receiving the instruction, the sensor terminal transmits to the management terminal or the specified node at the second transmission power.

3 Claims, 12 Drawing Sheets

(51) Int. Cl.
*H04W 40/22* (2009.01)
*H04W 4/00* (2009.01)
*H04W 72/04* (2009.01)
H04W 40/12 (2009.01)
H04W 84/18 (2009.01)
H04L 29/08 (2006.01)

(52) U.S. Cl.
CPC ......... *H04W 40/22* (2013.01); *H04W 72/042* (2013.01); *H04W 72/0413* (2013.01); *H04L 67/1097* (2013.01); *H04W 40/12* (2013.01); *H04W 84/18* (2013.01); *Y02B 60/50* (2013.01)

(58) Field of Classification Search
USPC ......................................................... 370/235
See application file for complete search history.

(56) References Cited

U.S. PATENT DOCUMENTS

| 2011/0149844 | A1* | 6/2011 | G. | H04L 45/122 |
| | | | | 370/328 |
| 2014/0204757 | A1* | 7/2014 | Ishizaki | H04W 40/04 |
| | | | | 370/235 |

FOREIGN PATENT DOCUMENTS

| JP | 2002-109675 A | 4/2002 |
| JP | 2007-068043 A | 3/2007 |
| JP | 2008-172459 A | 7/2008 |
| JP | 2009-296262 A | 12/2009 |

\* cited by examiner

SCHEMATIC CONFIGURATION OF
WIRELESS SENSOR NETWORK SYSTEM

SCHEMATIC CONFIGURATION OF SENSOR TERMINAL

FIG.4

| | TIME SLOT | | | | |
|---|---|---|---|---|---|
| ··· | D: NODE 1<br>S: NODE 2<br>CH: CHANNEL 5 | D: NODE 2<br>S: NODE 4<br>CH: CHANNEL 4 | D: NODE 5<br>S: NODE 2<br>CH: CHANNEL 2 | D: NODE 3<br>S: NODE 1<br>CH: CHANNEL 1 | ··· |

TIME →

| | | | | | |
|---|---|---|---|---|---|
| ··· | D: NODE 3<br>S: NODE 6<br>CH: CHANNEL 3 | D: NODE 7<br>S: NODE 3<br>CH: CHANNEL 2 | D: NODE 6<br>S: NODE 3<br>CH: CHANNEL 7 | D: NODE 4<br>S: NODE 2<br>CH: CHANNEL 5 | ··· |

RESOURCE MANAGEMENT OF TSCH SCHEME

EXAMPLE OF OPERATION OF THIS SYSTEM (1)

EXAMPLE OF OPERATION OF THIS SYSTEM (3)

EXAMPLE OF OPERATION OF THIS SYSTEM (4): UPLINK COMMUNICATION

FIG. 10

| NODE ID | NOW NODE | NUMBER OF CHILD NODES | AVAILABLE FOR HIGH POWER | NUMBER OF HOPS |
|---|---|---|---|---|
| 2 | GW(1) | 2 | O | 1 |
| 3 | 2 | 1 | O | 2 |
| 4 | 3 | 0 | X | 3 |
| 5 | GW(1) | 3 | O | 1 |
| ⋮ | ⋮ | ⋮ | ⋮ | ⋮ |
| A | GW(1) | 2 | O | 1 |
| ⋮ | ⋮ | ⋮ | ⋮ | ⋮ |
| B | A | 0 | X | 2 |
| ⋮ | ⋮ | ⋮ | ⋮ | ⋮ |

EXAMPLE OF ROUTING TABLE OF GW TERMINAL

FIG. 11

|  | DESTINATION | NEXT NODE | POWER MODE |
|---|---|---|---|
| UPLINK | GW(1) | GW(1) | HIGH POWER MODE |
| DOWNLINK | A1 | A1 | LOW POWER MODE |
|  | A2 | A1 | LOW POWER MODE |
|  | A3 | A3 | LOW POWER MODE |
|  | A4 | A3 | LOW POWER MODE |
|  | A5 | A3 | LOW POWER MODE |

EXAMPLE OF ROUTING TABLE OF SENSOR TERMINAL

PROCESSING IN GW TERMINAL

WIRELESS SENSOR NETWORK SYSTEM

FIELD OF THE INVENTION

The present invention relates to a wireless sensor network system and more particularly, to a wireless sensor network system which is capable of reducing delay time by preventing increase in a traffic amount of an overall system and capable of efficiently operating the system by preventing concentration of a traffic load on a specified terminal.

BACKGROUND OF THE INVENTION

Description of Prior Art

A wireless sensor network system has been used as a system which includes a plurality of sensor terminals and collects data of equipment monitoring and data of power, gas and water usage in a factory or a plant through wireless communication. In such a wireless sensor network system, in many cases, a sensor terminal may access a server or the like via a wired network in order to manage data collected from sensor terminals. A sensor terminal, which has the function of access the wired network and arranges and transmits data from a sensor terminal within a network to a server, is referred to as a gateway terminal (GW terminal).

A specified low power wireless device is often used as the wireless terminal (sensor terminal) used in a wireless sensor network system. Although the maximum wireless transmission power of the specified power wireless device is limited to 10 mW, increase of the upper limit is being considered.

In addition, in the wireless sensor network system, one network may include several thousands to tens of thousands sensor terminals, and accordingly, in order to prevent inter-sensor terminal interference and reduce power consumption, it is desirable to restrict wireless transmission power and wireless transmission frequency.

Accordingly, for the purpose of securing reliability of wireless communication quality, each sensor terminal performs communication at a wireless transmission power set by considering to allow reliable communication even in case of deteriorated communication quality of a propagation path, without performing a control dynamically and finely adjust transmission power as in a mobile phone or a wireless data module. It is common that the wireless transmission power is set when the sensor terminal is installed.

In the wireless sensor network system, sensor terminals participate in the network via adjacent terminals in an ad-hoc way, to sequentially form a network topology (communication route).

Then, each node (sensor terminal) conducts communication by sequentially transmitting (hopping) a traffic to the next node. This multi-hop communication can cover a wide area.

However, transmission delay may be increased with an increase in the number of hops from the GW terminal, and, depending on arrangement of sensor terminals, a traffic load may be concentrated on a specific sensor terminal and data transfer delay through the specific sensor terminal may be increased.

Related Art

One of techniques related to the wireless sensor network system is disclosed in Japanese Patent Application Publication No. 2009-296262 (Title: Radio Communication Device) (Hitachi Kokusai Electric Inc., Patent Document 1). As disclosed in Patent Document 1, a terminal includes a narrow band radio device having a wide coverage and a wide band radio device having a narrow coverage. In conduction of communication, destination information is transmitted from the narrow band radio device and route information is received in the narrow band radio device from a destination node within a certain period of time. If the route information matches with stored information, the terminal performs communication with the reception destination node based on the route information by using the wide band device. In this way, the terminal achieves efficient utilization of radio resources.

However, in the conventional wireless sensor network system, depending on arrangement of sensor terminals, transmission delay may be increased with an increase in the number of hops and the traffic load may be concentrated on a specific sensor terminal.

SUMMARY OF THE INVENTION

In view of the above, it is an object of the present invention to provide a wireless sensor network system which is capable of preventing transfer delay and concentration of a traffic load on a specific terminal and operating the entire system efficiently.

In order to solve the above problems, there is provided a wireless sensor network system in accordance with the present invention includes: a plurality of sensor terminals, each of which includes a sensor and conducts wireless communication; and a management terminal operable to construct a communication route with the sensor terminals and conduct wireless communication with each of the sensor terminals based on the communication route, the sensor terminals and the management terminal serving as nodes, wherein when an additional sensor terminal participates in a network, the additional sensor terminal transmits a join request to the management terminal via existing nodes at first transmission power; wherein when the management terminal receives the join request, the management terminal calculates a traffic load of one or more nodes on a route through which the join request has been received, determines the route as the communication route of the additional sensor terminal if both the number of hops and the traffic load are within their respective permissible ranges, and reconstructs the communication route of the additional sensor terminal by outputting an instruction to the additional sensor terminal to make direct connection to the management terminal or a specific node having a low traffic load at a second transmission power higher than the first transmission power if at least one of the number of hops and the traffic load is out of the permissible ranges; and wherein when the additional sensor terminal receives the instruction, the additional sensor terminal transmits data to the management terminal by connecting to the management terminal directly or via the specific node at the second transmission power.

Further, in accordance with the present invention, there is provided a management terminal which constitutes nodes together with a plurality of sensor terminals in a wireless sensor network system, constructs a communication route with each of the sensor terminals, and conducts wireless communication with each of the sensor terminals based on the communication route, wherein when the management terminal receives a network join request transmitted at a first transmission power from additional sensor terminal, the management terminal calculates both the number of hops of the sensor terminal based on a route through which the join request has been received and a traffic load of one or more nodes on the route through which the join request is received, determines the route through which the join request has been received as the communication route of the sensor terminal if both of the number of hops and the traffic load are within their respective permissible ranges, and reconstructs the communication route by outputting an instruction to the sensor terminal to make direct connection to the management terminal or a specific node having a low traffic load at the second transmission power higher than the first transmission power if at least one of the number of hops and the traffic load is out of the permissible ranges.

In addition, in accordance with the present invention, there is provided a sensor terminal which constitutes nodes of a wireless sensor network system together with a management terminal and conducts wireless communication based on an instruction from the management terminal, wherein the sensor terminal transmits a join request to the management terminal at a first transmission power via an existing node when the sensor terminal participates in the network, and, upon receiving the instruction to make direct connection to the management terminal or a specific node having a low traffic load at a second transmission power higher than the first transmission power from the management terminal, a sensor terminal transmits data to the management terminal or the specific node at the second transmission power.

EFFECTS OF THE INVENTION

Since the wireless sensor network system includes: a plurality of sensor terminals, each of which includes a sensor and conducts wireless communication; and a management terminal operable to construct a communication route with the sensor terminals and conduct wireless communication with each of the sensor terminals based on the communication route, the sensor terminals and the management terminal serving as nodes, wherein when an additional sensor terminal participates in a network, the additional sensor terminal transmits a join request to the management terminal via existing nodes at first transmission power; wherein when the management terminal receives the join request, the management terminal calculates a traffic load of one or more nodes on a route through which the join request has been received, determines the route as the communication route of the additional sensor terminal if both the number of permissible hops and the traffic load are within their respective permissible ranges, and reconstructs the communication route of the additional sensor terminal by outputting an instruction to the additional sensor terminal to make direct connection to the management terminal or a specific node having a low traffic load at a second transmission power higher than the first transmission power if at least one of the number of hops and the traffic load is out of the permissible ranges; and wherein when the additional sensor terminal receives the instruction, the additional sensor terminal transmits data to the management terminal by connecting to the management terminal directly or via the specific node at the second transmission power, it is possible to prevent data transfer delay due to increase in the number of hops and concentration of a load on a specific node, prevent increase in the amount of traffic of the entire network, and operate the system efficient.

In addition, since a management terminal which constitutes nodes together with a plurality of sensor terminals in a wireless sensor network system, constructs a communication route with each of the sensor terminals, and conducts wireless communication with each of the sensor terminals based on the communication route, wherein when the management terminal receives a network join request transmitted at a first transmission power from additional sensor terminal, the management terminal calculates both the number of hops of the sensor terminal based on a route through which the join request has been received and a traffic load of one or more nodes on the route through which the join request is received, determines the route through which the join request has been received as the communication route of the sensor terminal if both of the number of hops and the traffic load are within their respective permissible ranges, and reconstructs the communication route by outputting an instruction to the sensor terminal to make direct connection to the management terminal or a specific node having a low traffic load at the second transmission power higher than the first transmission power if at least one of the number of hops and the traffic load is out of the permissible ranges, it is possible to indicate proper transmission power and access destination for a sensor terminal, prevent increase in the number of hops and concentration of a load on a node, prevent increase in the traffic amount of the entire network, and operate the system efficiently.

Further, since a sensor terminal which constitutes nodes of a wireless sensor network system together with a management terminal and conducts wireless communication based on an instruction from the management terminal, wherein the sensor terminal transmits a join request to the management terminal at a first transmission power via an existing node when the sensor terminal participates in the network, and, upon receiving the instruction to make direct connection to the management terminal or a specific node having a low traffic load at a second transmission power higher than the first transmission power from the management terminal, a sensor terminal transmits data to the management terminal or the specific node at the second transmission power, it is possible to conduct communication at proper power and access destination based on an instruction from the management terminal and construct an efficiently-operable system.

BRIEF DESCRIPTION OF THE DRAWINGS

FIG. 4 is a schematic explanatory view showing TSCH-based resource management.

FIG. 10 is an explanatory view showing an example of routing table of a GW terminal.

FIG. 11 is an explanatory view showing an example of routing table of a sensor terminal.

DETAILED DESCRIPTION OF THE EMBODIMENTS

Figure 1:
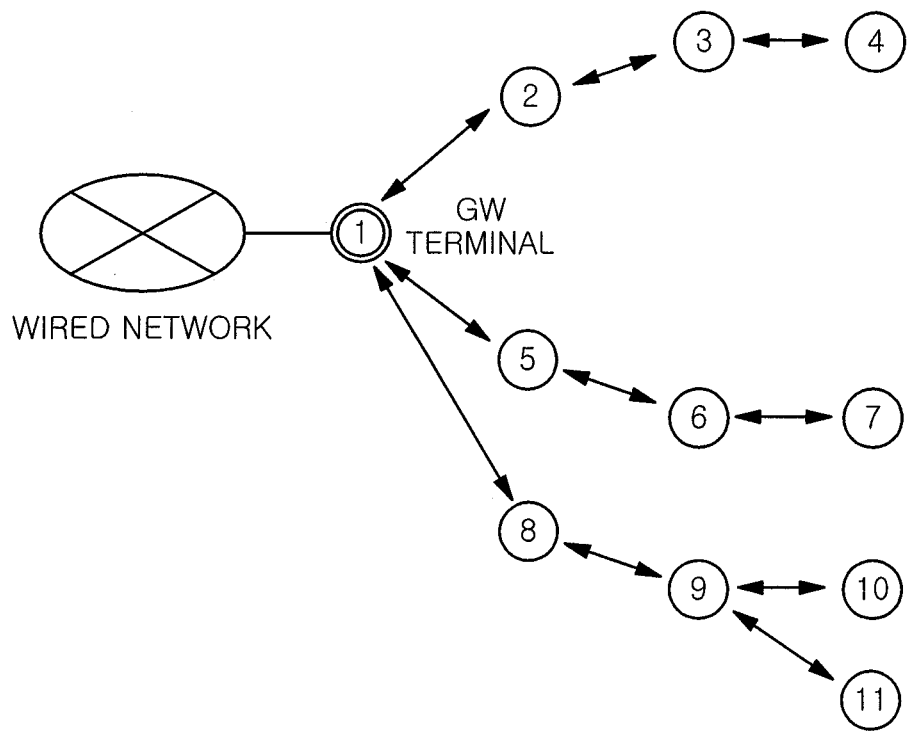
FIG. 1 is a schematic explanatory view showing a general configuration example of a wireless sensor network system according to an embodiment of the present invention.

Embodiments of the present invention will be described with reference to the drawings.

Outline of Embodiments

A wireless sensor network system according to embodiments of the present invention includes sensor terminals and a GW terminal (management terminal), each of the sensor terminals and the GW terminal having a low power mode of about 10 mW for performing ad hoc communication and a high power mode for performing a wide range communication at a higher power. When a sensor terminal newly joins a network, the sensor terminal accesses the GW terminal via adjacent sensor terminals at the low power mode, and the GW terminal calculates the number of hops of the corresponding sensor terminal in a reception route and a traffic load of each node on the reception route. If both of the number of hops and the traffic load are within their respective permissible ranges, the GW terminal determines a communication route of the corresponding newly joining sensor terminal in the reception route. If at least one of the number of hops and the traffic load is out of the permissible range, the GW terminal switches the corresponding newly joining sensor terminal to the high power mode, and reconstructs the communication route by instructing the sensor terminal to make direct access to the GW terminal. Accordingly, traffic delay due to increase in the number of hops and concentration of a traffic load can be prevented and the system can be efficiently operated.

Further, when receiving from the sensor terminal a join request including route information, the GW terminal according to the embodiments of the present invention calculates the number of hops of the sensor terminal and the traffic loads of nodes on a route, and compares the calculated number of hops and the calculated traffic load with their respective threshold values. If both of the number of hops and the traffic load are within the respective permissible ranges, the GW terminal connects the corresponding sensor terminal thereto based on the route information. If at least one of the number of hops and the traffic load is out of the permissible range, the GW terminal switches the sensor terminal to the high power mode, reconstructs the route to allow the sensor terminal to make direct connection with the GW terminal, and informs the sensor terminal of the reconstructed route. Accordingly, traffic delay due to increase in the number of hops and concentration of a traffic load can be prevented and the system can be efficiently operated.

Furthermore, the sensor terminal according to the embodiments of the present invention includes the low power mode and the high power mode, and transmits a join request to the GW terminal via the adjacent terminals at the lower power mode when the sensor terminal joins a network. If the GW terminal determines the switching to the high power mode and designates an access destination, the sensor terminal switches to the high power mode and reconstructs the route by making an access to the access destination at the high power mode. Accordingly, traffic delay due to increase in the number of hops and concentration of the load can be prevented and the entire system can be efficiently operated.

[Schematic Configuration of Wireless Sensor Network System According to Embodiment: FIG. 1]

A schematic configuration example of a wireless sensor network system according to an embodiment of the present invention will be described with reference to FIG. 1. FIG. 1 is a schematic explanatory view showing a schematic configuration example of the wireless sensor network system according to the embodiment of the present invention.

As shown in FIG. 1, the wireless sensor network system according to the embodiment of the present invention includes a gateway terminal (GW terminal) and a plurality of sensor terminals.

In the figure, numbers represent node numbers. Node 1 is a GW terminal and node 2 to node 11 are sensor terminals. The GW terminal corresponds to a managing terminal set forth in the claims.

The GW terminal conducts bidirectional wireless communication with the sensor terminals based on established route information while making an access to a wired network to conduct communication with a server or the like. The sensor terminals conduct only wireless communication.

In a network topology of FIG. 1, the GW terminal (node 1) is connected to node 2, node 5 and node 8.

Node 2 is sequentially connected with node 3 and node4, node 5 is sequentially connected with node 6 and node 7, node 8 is connected to node 9, and node 9 is connected with node 10 and node 11.

This system employs a TSCH (Time Slotted Channel Hopping) scheme in which a wireless resource allocation is performed by the GW terminal, or alternatively, may employ a CSMA/CA (Carrier Sense Multiple Access with Collision Avoidance). The network topology of the system is of a tree topology, or alternatively, may be of a mesh topology.

Figure 2:
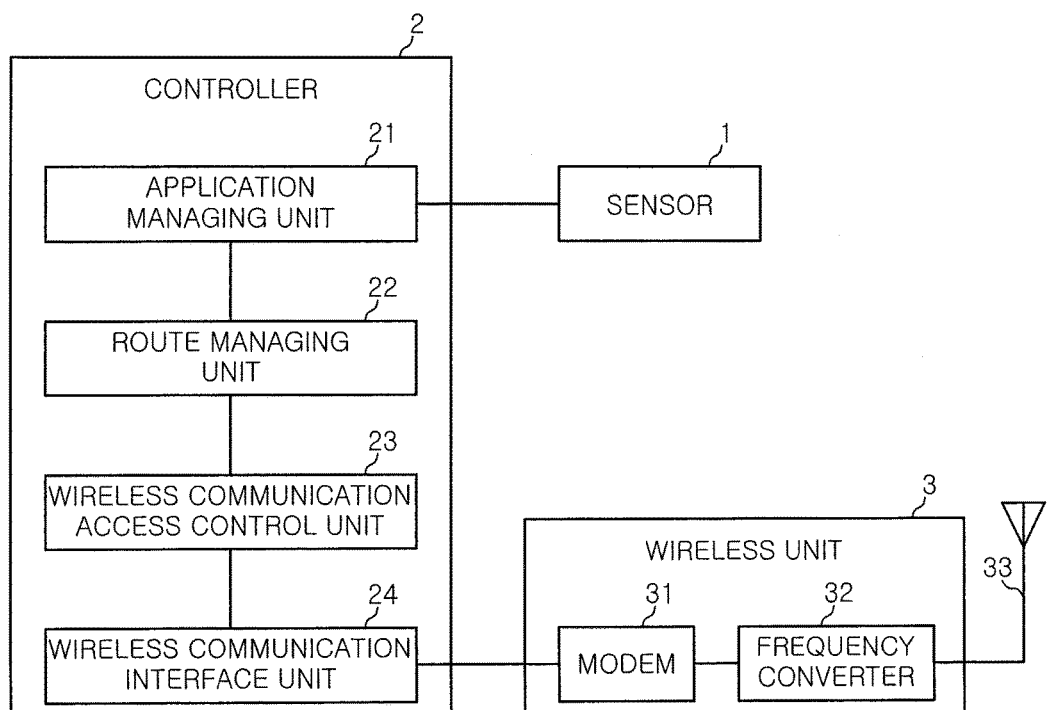
FIG. 2 is a schematic configuration view of a sensor terminal of this system.

[Configuration of Sensor Terminal: FIG. 2]

Next, a configuration of a sensor terminal will be described with reference to FIG. 2. FIG. 2 is a schematic configuration view of a sensor terminal of this system.

As shown in FIG. 2, the sensor terminal which includes a sensor 1, a controller 2 and a wireless unit 3 is a wireless communication terminal.

[Sensor 1]

The sensor 1 acquires sensing data such as, for example, a power meter and the like and outputs the acquired sensing data (for example, power consumption) to the controller 2.

[Controller 2]

The controller 2 includes a microcomputer or the like having a processor and a memory and serves to control the entire operation of the sensor terminal. The processor includes an application managing unit 21, a route managing unit 22, a wireless communication access control unit 23 and a wireless communication interface unit 24.

The controller 2 executes predetermined processes when each of the processor starts programs stored in the memory.

[Components of Controller 2]

Components of the controller 2 will now be described.

(Application Managing Unit 21)

The application managing unit 21 receives sensing data from the sensor 1 and stores the sensing data together with the reception time. In addition, the application managing unit 21 reads the sensing data at a timing of data transmission to the GW terminal and generates package information in accordance with a preset schedule.

(Route Managing Unit 22)

The route managing unit 22 operates at a network (NW) layer and stores a routing table. The routing table stores an address of the GW terminal serving as a reception destination and an address of the next node on a route from the corresponding sensor terminal to the GW terminal for the uplink direction. In addition, the routing table stores an address of a node having a lower rank than the corresponding sensor terminal and an address of the next node on the route for the downlink direction. The route managing unit 22 updates the routing table and changes route information based on an instruction from the GW terminal. The route change will be described later.

In addition, as a feature of this system, the route managing unit 22 stores a power mode that specifies transmission power for each reception destination in the routing table.

The power mode includes a low power mode having low transmission power (about 10 mW) for use in ad-hoc communication and a high power mode having large transmission power (about 1 W), one of which is stored in each reception destination. At the time of data transmission, the power mode stored in each reception destination is read and set.

As another feature of this system, the route managing unit 22 changes the transmission power for the wireless unit 3 according to the transmission power mode. That is, the wireless unit 3 is switched to low power if the low power mode is set and switched to high power if the high power mode is set.

The transmission power in the low power mode corresponds to a first transmission power set forth in the claims and the transmission power in the high power mode corresponds to a second transmission power set forth in the claims.

Accordingly, for example, the high power mode can be set when the GW terminal is designated as a destination in an uplink direction, and the low power mode can be set in communication between adjacent nodes in which the destination is a node of a lower rank.

In addition, the route managing unit 22 changes the power mode according to an instruction from the GW terminal. Further, the route managing unit 22 of the sensor terminal stores the low power mode as a default.

(Wireless Communication Access Control Unit 23)

The wireless communication access control unit 23 functions as a MAC (Media Access Control) layer and performs wireless communication control based on an access scheme such as a CSMA/CA (Carrier Sense Multiple Access/Collision Avoidance) scheme, a TSCH (Time Slotted Channel Hopping) scheme or the like. At the time of transmission, the wireless communication access control unit 23 outputs a power mode designated by the route managing unit 22 to the wireless communication interface unit 24.

(Wireless Communication Interface Unit 24)

The wireless communication interface unit 24 operates at a physical (PHY) layer, and generates and decomposes wireless frame data.

[Wireless Unit 3]

The wireless unit 3 includes a modem 31, a frequency converter 32 and an antenna 33.

(Modem 31)

The modem 31 modulates wireless frame data from the wireless communication interface unit 24 into a modulated baseband signal at the time of transmission.

In addition, at the time of reception, the modem 31 demodulates the baseband signal from the frequency converter 32, performs bit decision and outputs received data.

(Frequency Converter 32)

The frequency converter 32 converts a modulated baseband signal into a radio frequency signal at the time of transmission and outputs the radio frequency signal to the antenna 33.

In particular, in the sensor terminal of this system, the wireless unit 3 performs transmission in either of the low power mode or the high power mode. The change of the transmission power is performed by the route managing unit 22 of the controller 2.

At the time of reception, the frequency converter 32 converts a radio frequency band signal received in the antenna 33 into the baseband signal.

The antenna 33 includes an amplifier for amplifying a transmission signal, and serves to amplify a transmission signal converted into a radio frequency signal to have a transmission power instructed by the controller, and radiates the amplified transmission signal to the air.

In addition, the antenna 33 receives the radio frequency signal from the air and outputs this signal to the frequency converter 32.

The wireless unit 3 performs signal transmission to adjacent nodes at a power of about 10 mW when switched to the low power mode, and performs signal transmission at a power of, e.g., about 1 W greater than the low power mode when switched to the high power mode. The high power mode can provide a wide communication coverage to allow the wireless unit 3 to conduct direct communication with the GW terminal or other upper nodes which are remotely placed.

Figure 3:
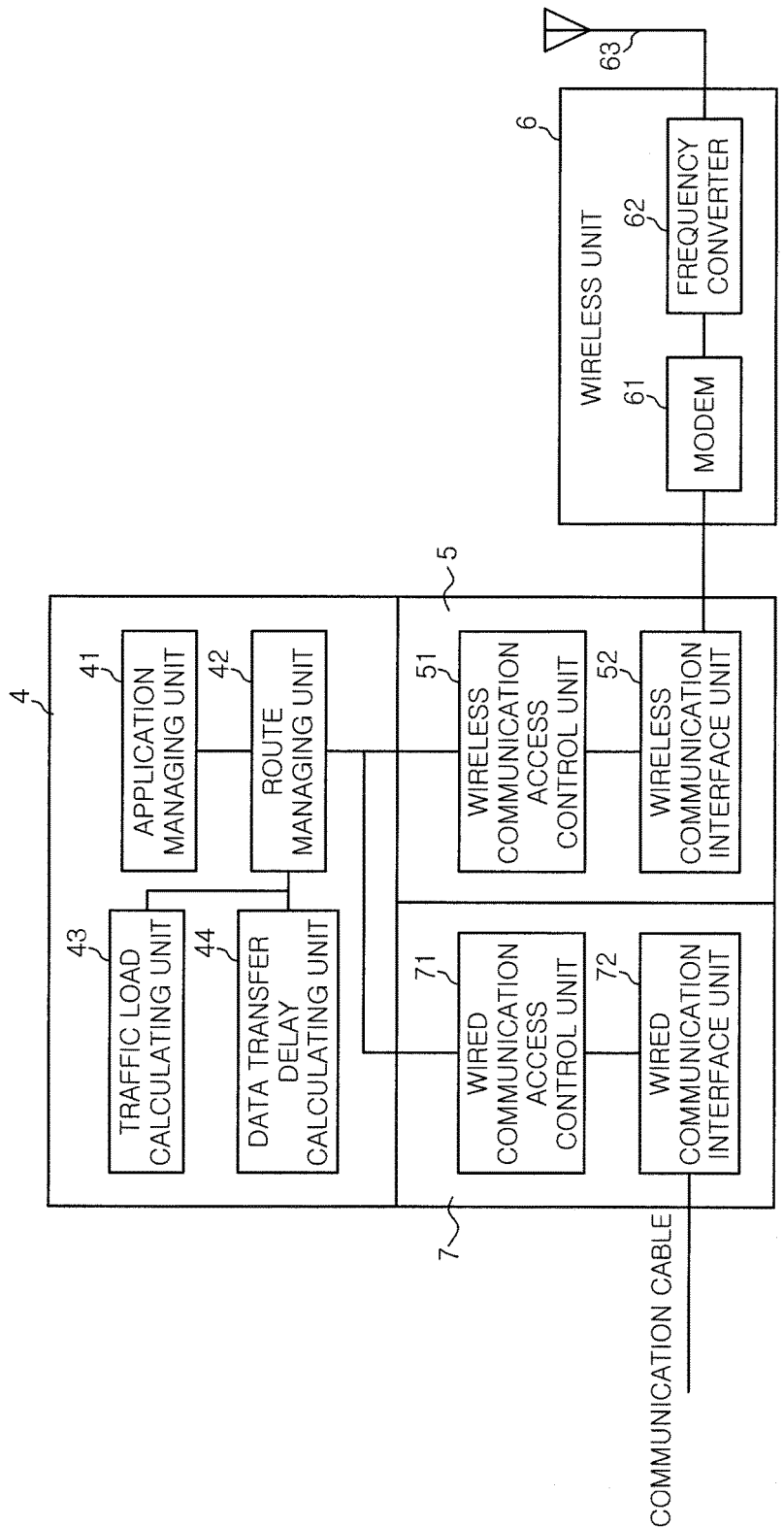
FIG. 3 is a schematic configuration view of a GW terminal of this system.

[Configuration of GW Terminal: FIG. 3]

Next, a configuration of the GW terminal will be described with reference to FIG. 3 which is a schematic configuration view of the GW terminal of this system.

As shown in FIG. 3, the GW terminal includes a controller 4, a wireless communication processor 5, a wireless unit 6 and a wired communication processor 7. The GW terminal has basically a configuration where the wired communication processor 7 is added to the configuration of the sensor terminal shown in FIG. 2, but the controller 4 is different in the configuration and the operation from that of the sensor terminal.

Like the sensor terminal, the GW terminal conducts communication by switching the transmission power between the high power and the low power.

The wireless communication processor 5 includes a wireless communication access control unit 51 and a wireless communication interface unit 52 and the wired communication processor 7 includes a wired communication access control unit 71 and a wired communication interface unit 72.

Each of the above-mentioned components will be described below.

[Controller 4]

The controller 4 includes an application managing unit 41, a route managing unit 42, a traffic load calculating unit 43 and a data transfer delay calculating unit 44.

(Application Managing Unit 41)

The application managing unit 41 of the controller 4 converts information collected from each of sensor terminal into data for wired communication or converts control information received from the server through wired communication into data for wireless communication.

(Route Managing Unit 42)

The route managing unit 42 serves to construct route information of an entire system and instructs a route reconstruction or switching of a power mode related to the sensor terminal. The route managing unit 42 includes a routing table as routing information of all sensor terminals connected to the GW terminal. The routing table of the GW terminal will be described later.

As one feature of this system, the route managing unit 42 stores the power modes (high power mode/low power mode)

for sensor terminals directly connected to the CW terminal and outputs an instruction to the wireless unit 3 to switch transmission power in compliance with the power mode corresponding to each of the sensor terminal at the time of transmission to each of the sensor terminal.

That is, the route managing unit 42 controls to transmit at a low power if it transmits to the sensor terminal set with the low power mode and transmit at a high power if it transmits to the sensor terminal set with the high power mode.

The route managing unit 42 generates a control packet for instructing a sensor terminal to change the network topology. Specifically, the control packet includes information for updating the routing table of each sensor terminal and instructs switching of power mode or change of an access destination.

In addition, the route managing unit 42 stores an address of a server or the like that is as a communication destination of wired communication.

At the time of joining of a new sensor terminal, based on calculation results from the traffic load calculating unit 43 and the data transfer delay calculating unit 44, the route managing unit 42 updates its own routing table by executing a route reconstruction, if necessary, and transmits a control packet to a corresponding sensor terminal. An operation of the route managing unit 42 will be described in detail later.

(Traffic Load Calculating Unit 43)

The traffic load calculating unit 43 calculates traffic loads of sensor terminals on a route by referring to the routing table when a new sensor terminal participates in the network. The traffic load is calculated based on the number of slots allocated to each sensor terminal and is increased with increase in the number of lower sensor terminals directly or indirectly connected to the corresponding sensor terminal. Then, the traffic load calculating unit 43 determines whether or not the calculated traffic load exceeds a pre-stored threshold value of the traffic load and then informs a result of the determination to the route managing unit 42.

Accordingly, when a new sensor terminal joins the network, the route managing unit 42 of the GW terminal of this system determines whether or not there is a sensor terminal on which the traffic load is concentrated due to the addition of the sensor terminal in the network. If there is a sensor terminal on which the traffic load is concentrated, the route managing unit 42 switches one of lower nodes to the high power mode so as not to pass through a node on which the traffic load is concentrated to perform a route reconstruction and selects an access destination, thereby preventing the traffic load from being concentrated on the sensor terminal.

(Data Transfer Delay Calculating Unit 44)

When a new sensor terminal participates in the network, the data transfer delay calculating unit 44 obtains the number of hops of the corresponding new sensor terminal and an amount of data transfer delay by referring to the routing table, compares the calculated amount of data transfer delay with a pre-stored threshold value to determine whether or not the amount of data transfer delay is within a permissible range, and then informs a result of the determination of the route managing unit 42.

Accordingly, if the amount of data transfer delay of the new sensor terminal is out of the permissible range, the route managing unit 42 of the GW terminal of this system switches a power mode of the new sensor terminal to the high power mode and performs a route reconstruction so as to conduct direct communication with the GW terminal.

As an alternative, the data transfer delay calculating unit 44 may make a determination with only the number of hops from the corresponding sensor terminal to the GW terminal without calculating the amount of data transfer delay. In this case, the data transfer delay calculating unit 44 compares the number of hops from the corresponding sensor terminal with a stored threshold value and determines that the number of hops is within a permissible range if the number of hops is equal to or less than the threshold value and is out of the permissible range if the number of hops exceeds the threshold value.

[Wireless Communication Processor 5]

(Wireless Communication Access Control Unit 51)

The wireless communication access control unit 51 operates at a MAC layer and performs a control of an access scheme such as a CSMA/CA scheme or a TSCH scheme, like the wireless communication access control unit 23 of the sensor terminal.

(Wireless Communication Interface Unit 52)

The wireless communication interface unit 52 operates at a PHY layer, and generates and decomposes wireless frame data.

[Wireless Unit 6]

The wireless unit 6 includes a modem 61, a frequency converter 62 and an antenna 63 and performs transmission/reception of wireless signals. Various components of the wireless unit 6 have the same configuration and operation as those of the wireless unit 3 of the sensor terminal. The antenna 63 includes an amplifier for amplifying a transmission signal and transmits the transmission signal at the transmission power corresponding to a transmission mode set by the route managing unit 42.

The transmission power of the GW terminal may be about 10 mW in the low power mode and about 1 W in the high power mode, like the sensor terminal.

[Wired Communication Processor 7]

The wired communication processor 7 includes the wired communication access control unit 71 and the wired communication interface unit 72. (Wired Communication Access Control Unit 71)

The wired communication access control unit 71 performs a communication control based on an access scheme of a wired network.

(Wired Communication Interface Unit 72)

The wired communication interface unit 72 transmits frame data of a wired network to the server or the like on the wired network through a communication cable and receives frame data such as control information or the like from the server.

[Resource Management of TSCH Scheme: FIG. 4]

Next, resource management of a TSCH scheme used in this system will be described with reference to FIG. 4, which is a schematic explanatory view showing resource management of the TSCH scheme.

It is here assumed that a number of usable radio channels is 7 and the wireless communication access control unit 51 of the GW terminal allocates usable time slots to each node.

Specifically, the GW terminal controls to perform an allocation (reservation) and multiplex communication by designating a transmission destination node D, a transmission source node S and a radio channel number for each time slot.

Thus, since a transmissible time slot and a receivable time slot are determined in advance, a sensor terminal can transmit/receive only time slots allocated to its local nodes.

Time slots not allocated to the local nodes may not be transmitted/received or may be slept, thereby preventing interference and reducing power consumption.

A band reservation system such as the TSCH scheme can limit delay time and traffic loads and operate this system efficiently, although the CSMA/CA scheme may also realize this system.

Figure 5:
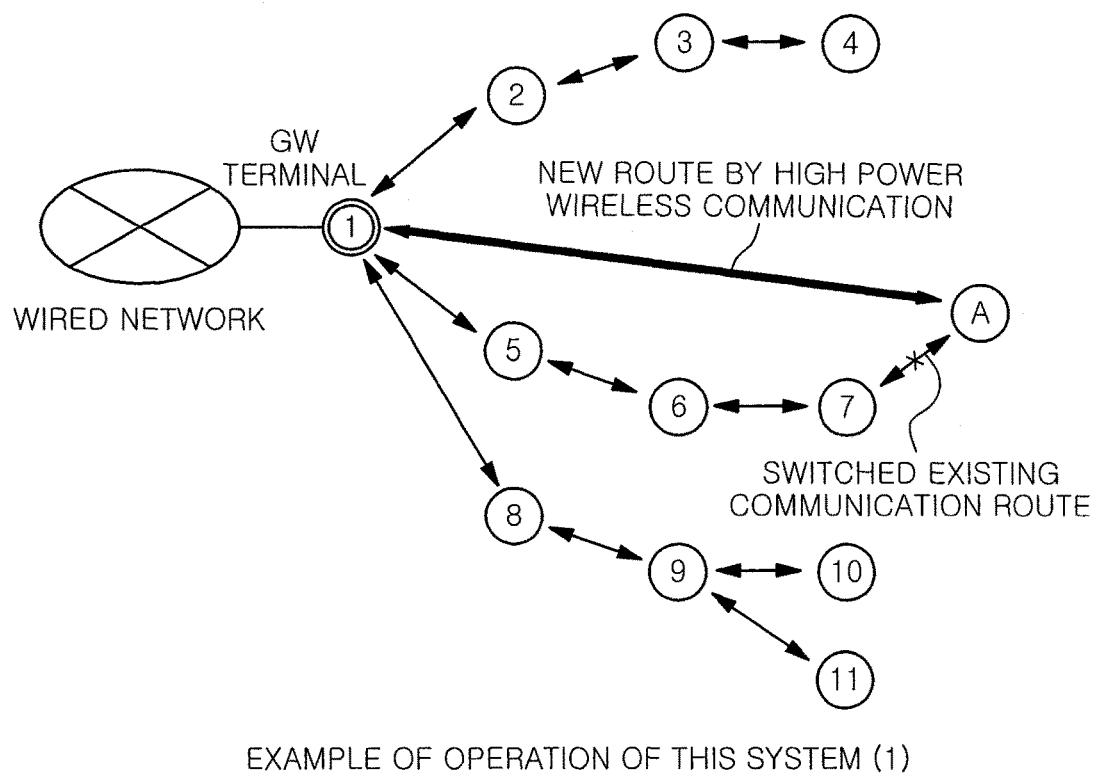
FIG. 5 is a schematic explanatory view showing a first example of operation of this system.

[First Example of Operation of this System: FIG. 5]

Next, a first example of operation of this system will be described with reference to FIG. 5, which is a schematic explanatory view showing the first example of operation of this system.

The first example of operation is about a route reconstruction in a case where data transfer delay occurs due to increase in the number of hops.

FIG. 5 shows an example in a case where a sensor terminal is newly added to the network shown in FIG. 1.

It is here assumed that the upper limit of the number of hops is 3 and a threshold value of the number of hops set in the data transfer delay calculating unit 44 of the controller 4 of the GW terminal is 3.

As shown in FIG. 5, first, under the condition where a network including the GW terminal (node 1) and a plurality of sensor terminals (node 2 to node 11) is established, a new node A accesses node 7 and transmits a join request to the GW terminal. In this case, the transmission is performed at a low power mode set as a default. At this point of time, node 7 is stored as the next node in a routing table of node A when the GW terminal is assumed to be a destination.

The join request received in node 7 from node A is received in the GW terminal via node 7, node 6 and node 5 based on an established route.

In the GW terminal, the controller 4 acquires route information (node A→node 7→node 6→GW terminal) of node A from received data and obtains the number of hops of node A by referring to the routing table of the route managing unit 42.

Specifically, the data transfer delay calculating unit 44 of the GW terminal reads the number of hops of node 7 as a parent node of node A and adds 1 thereto to provide the number of hops of node A. In FIG. 5, the data transfer delay calculating unit 44 determines that the number of hops of node A is 4 and exceeds the upper limit of 3.

Accordingly, the route managing unit 42 of the GW terminal switches a power mode of node A to a high power mode and performs a route reconstruction to grant a permission to conduct direct communication with the GW terminal. Specifically, the route managing unit 42 switches the power mode of node A from the low power mode to the high power mode, generates a control packet including an indication that a communication destination is the GW terminal, and transmits the generated control packet to node A on a route reverse to a multi-hop route of the join request. In this case, the GW terminal transmits the control packet at the low power. The corresponding control information is received in node A via node 5, node 6 and node 7.

Node A updates its own routing table based on the control information received from the GW terminal. Specifically, for the uplink communication, if the destination is the GW terminal as the next node, node A is set to conduct direct communication with the GW terminal without passing through other nodes. Accordingly, node A is disconnected from node 7. In addition, in node A, the power mode corresponding to the uplink communication is set to the high power mode.

Accordingly, node A disconnected from node 7 is able to conduct direct communication with the GW terminal by high power wireless communication.

As a result, as shown in FIG. 5, the number of hops of node A becomes 1 and delay time can be prevented from being increased.

Then, node A transmits a response to the control packet to the GW terminal.

Upon receiving the response to the control information from node A, the route managing unit 42 of the GW terminal updates route information of the routing table corresponding to node A by rewriting the parent node of node A form node 7 to the GW terminal.

In addition, the route managing unit 42 stores that the communication with node A be conducted at the high power mode. Then, the route managing unit 42 performs transmission to node A at the high power.

In this manner, in the first example of operation of this system, if it is anticipated that the number of hops of a newly participating sensor terminal exceeds an upper limit to increase data transfer delay time, the GW terminal switches the newly participating sensor terminal to the high power mode and reconstructs a route to allow the newly participating sensor terminal to conduct direct communication with the GW terminal, thereby preventing the data transfer delay time from being increased.

Figure 6:
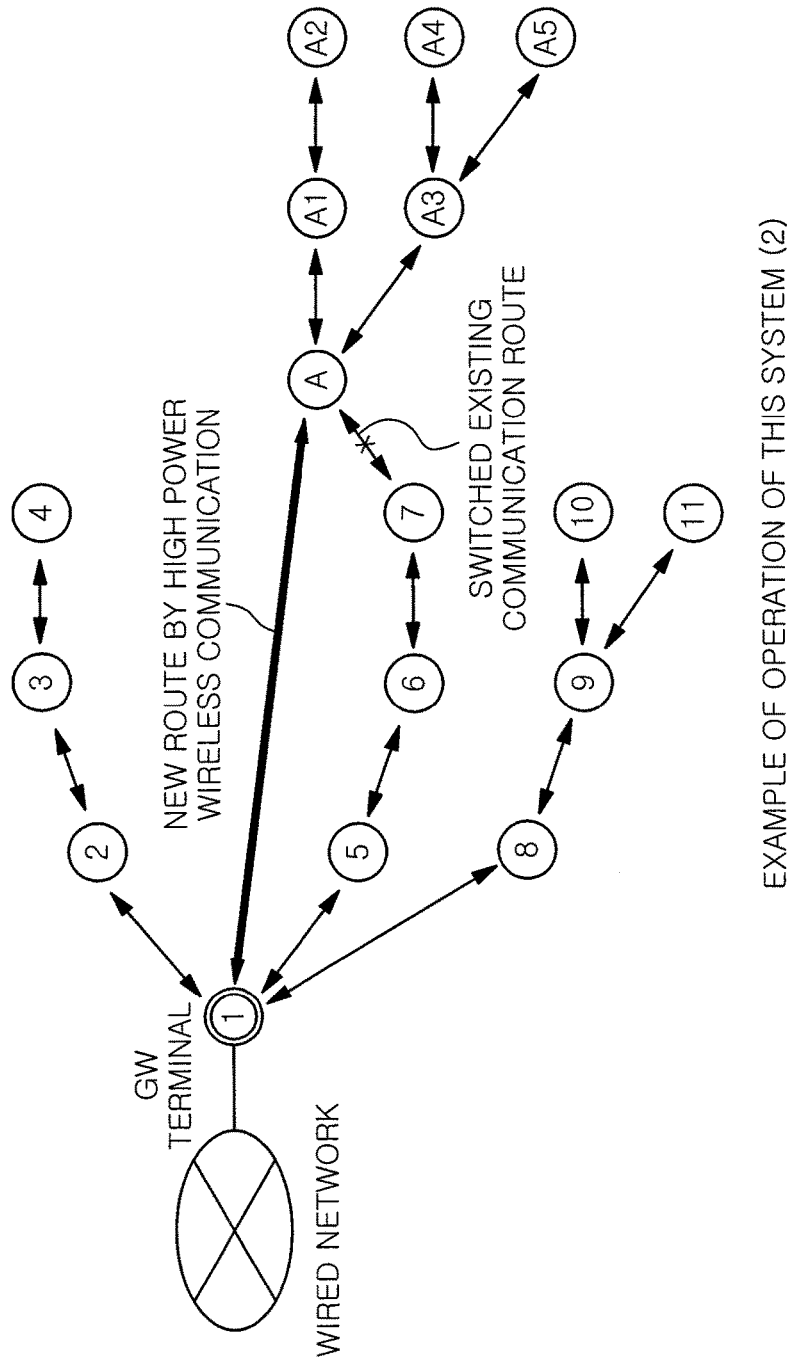
FIG. 6 is a schematic explanatory view showing a second example of operation of this system.

[Second Example of Operation of this System: FIG. 6]

Next, a second example of operation of this system will be described with respect to FIG. 6, which is a schematic explanatory view showing the second example of operation of this system.

The second example of operation involves a route reconstruction in a case where traffic load is increased although the number of hops does not exceed an upper limit.

In the second example of operation, the upper limit of the number of hops is set to 10 and a threshold value of the number of hops set in the data transfer delay calculating unit 44 of the controller 4 of the GW terminal is 10.

As shown in FIG. 6, first, if node A is newly added to be connected to node 7, the data transfer delay calculating unit 44 of the GW terminal compares the number of hops of node A with the threshold value and determines that the number of hops does not exceed the upper limit, and the route managing unit 32 registers the multi-hop route (GW terminal→node 5→node 6→node 7→node A) in the routing table as it is.

Thereafter, node A is connected with child nodes, node A1 and node A3, which are then connected with grandchild nodes, node A2, node A4 and node A5. The number of hops of each of the grandchild nodes is 6, which does not exceed the upper limit of the number of hops.

Whenever a new sensor terminal is added, the traffic load calculating unit 43 of the GW terminal calculates traffic loads of nodes on a route from the new sensor terminal to the GW terminal.

Traffic loads of all nodes on the route may not be calculated, but in which case, a node having the greatest load on the route from the GW terminal to nodes A to A5 is node 5 which is the uppermost node connected with many lower nodes and the traffic load is calculated at least for node 5.

If the traffic load calculating unit 43 detects that the traffic load of node 5 exceeds a threshold value, the route managing unit 42 switches node A to the high power mode in order to reduce the traffic load of node 5, updates the routing table to allow node A to conduct direct communication with the GW terminal, and transmits a control packet to node A as in the first example of operation.

Node A rewrites its own routing table and conducts direct communication with the GW terminal in the high power mode.

Accordingly, node A is disconnected from node 7 and the number of lower nodes connected to node 5 becomes 2, thereby significantly reduce the traffic load related to node 5.

Node A conducts communication with lower node A1 and node A3 in a low power mode in the same way as before.

In this manner, in the second example of operation, if it is anticipated that traffic loads of upper nodes are increased due to join of new sensor terminals, the GW terminal switches a sensor terminal lying at a proper position on the route to the high power mode and reconstructs a route to allow the sensor terminal to conduct direct communication with the GW terminal, thereby preventing a traffic load from being concentrated on a specific node.

In addition, in the second example of operation, a sensor terminal allowed to operate in the high power mode can prevent power wastefulness and interference by switching only communication with the GW terminal to the high power mode while using the low power mode for communication with lower nodes as conventional.

[Selection of Access Destination]

When node A is switched to the high power mode, a separate node having a small load may be selected as an access destination without limiting the access destination to the GW terminal, and a route to allow the corresponding node to relay communication between node A and the GW terminal may be constructed.

In FIG. 6, for example, assuming that an access destination of node A is node 2, the GW terminal instructs node A to transmit in the high power mode with an uplink destination designated as the GW terminal and with the next node corresponding thereto designated as node 2.

In addition, the GW terminal instructs node 2 to communicate in the high power mode with the next node designated as node A when downlink node A and its lower node are designated as destination.

Node A and node 2 rewrite their own routing tables based on the control packet and are connected in communication of the high power mode. In addition, node 2 and the GW terminal continue to conduct communication in the low power mode.

In addition, the GW terminal may operate in such a way that the GW terminal selects a plurality of nodes having a small load as candidates for relay nodes and actually uses the high power mode to attempt to conduct communication of known data via the candidate nodes between the GW terminal and node A to determine a route having the best communication quality.

[Route Determination]

In this system, known data are transmitted from the GW terminal based on a new route when the route reconstruction is performed, and the new route is determined to update the routing table when a response indicative of normal reception of the data is received from a sensor terminal of the destination. If transmission/reception on the new route cannot be normally performed, route reconstruction is performed again.

Accordingly, reliable communication routes can be stored in the routing table, thereby securing communication reliability.

Figure 7:
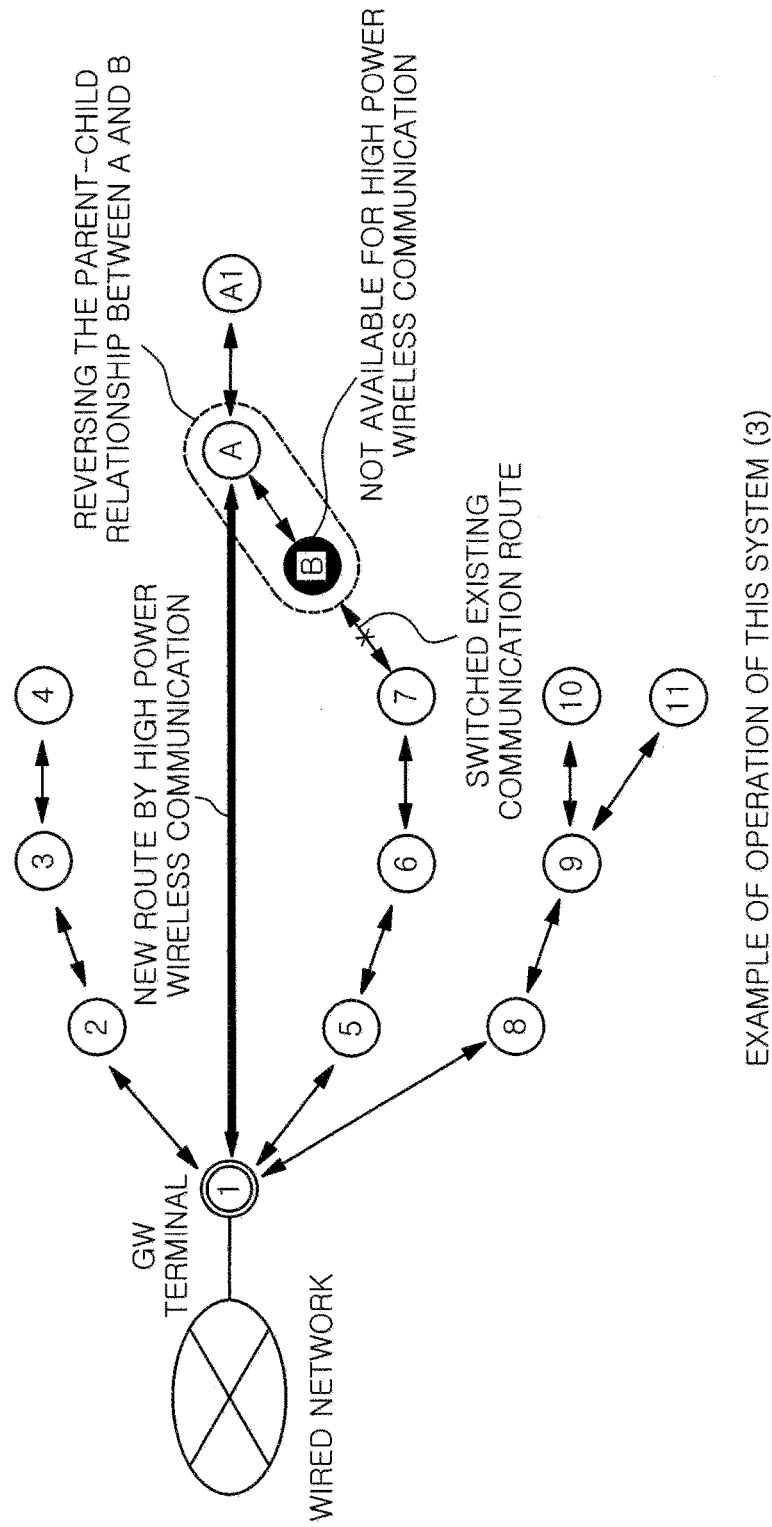
FIG. 7 is a schematic explanatory view showing a third example of operation of this system.

[Third Example of Operation of this System: FIG. 7]

Next, a third example of operation of this system will be described with reference to FIG. 7, which is a schematic explanatory view showing the third example of operation of this system.

The third example of operation involves a route reconstruction in a case where a node intended to be switched to the high power is not of a type available for high power.

In the third example of operation, the upper limit of the number of hops is set to 10 and a threshold value of the number of hops set in the data transfer delay calculating unit 44 of the controller 4 of the GW terminal is 10.

First, node B is connected to node 7 to join the network newly. Thereafter, node A and node A1 are sequentially added as subordinates of node B.

When the traffic load calculating unit 43 of the GW terminal calculates a traffic load related to node 5 and detects that the traffic load of node 5 exceeds a threshold value, the route managing unit 42 tries to switch node B to the high power mode and conduct direct communication in order to distribute the load efficiently from the current topology, as in the second example of operation.

The route managing unit 42 of the GW terminal, first, inquires of node B whether or not node B is of a type available for high power.

Upon receiving a response indicative of "not available for high power," the route managing unit 42 refers to the routing table to inquire of node A, which is connected to node B as a lower node thereof, whether or not node A is of a type available for high power.

Upon receiving a response indicative of "available for high power," the route managing unit 42 of the GW terminal switches node A to the high power mode to allow node A to conduct direct communication with the GW terminal and transmits to node A a control packet to cause node B to be a subordinate of node A. In addition, the route managing unit of the GW terminal transmits a control packet to node B such that node B becomes a subordinate of node A.

In the GW terminal, information "available for high power" or "not available for high power" of each sensor terminal which is confirmed by the inquiry is stored in the routing table. Accordingly, the inquiry may not be repeated in later route reconstruction, which may result in efficient route reconstruction.

The information "available for high power" or "not available for high power" may be externally preset or a sensor terminal may inform the GW terminal of this information when the sensor terminal joins the network.

Node A and node B overwrite their own routing tables and reconstruct routes.

In node B, the next node corresponding to the GW terminal in the uplink direction is updated node A and is disconnected from node 7. Accordingly, node B becomes a child node of node A, thereby reversing the parent-child relationship.

Node A conducts direct communication with the GW terminal in the high power mode and conducts communication with node B and node A1 in the low power mode.

In this manner, in the third example of operation, when the GW terminal switches any sensor terminal to the high power mode according to topology change, the GW terminal inquires of the corresponding sensor terminal whether or not it is available for high power. If the corresponding sensor terminal is not available for high power, the GW terminal can switch a lower node of the corresponding sensor terminal not available for high power to the high power mode to allow the lower node to conduct direct communication with the GW terminal, and reconstruct a route such that the sensor terminal not available for high power becomes a lower node of the sensor terminal available for high power, thereby preventing increase in the traffic load and increasing a degree of freedom of route construction.

Although it has been here described that node A immediately below node B is a sensor terminal available for high power, when node A is not available for high power, it is possible to inquire of a next lower node (node A1 in this example) whether or not available for high power and reconstruct the route with the node available for high power as a parent node.

Figure 8:
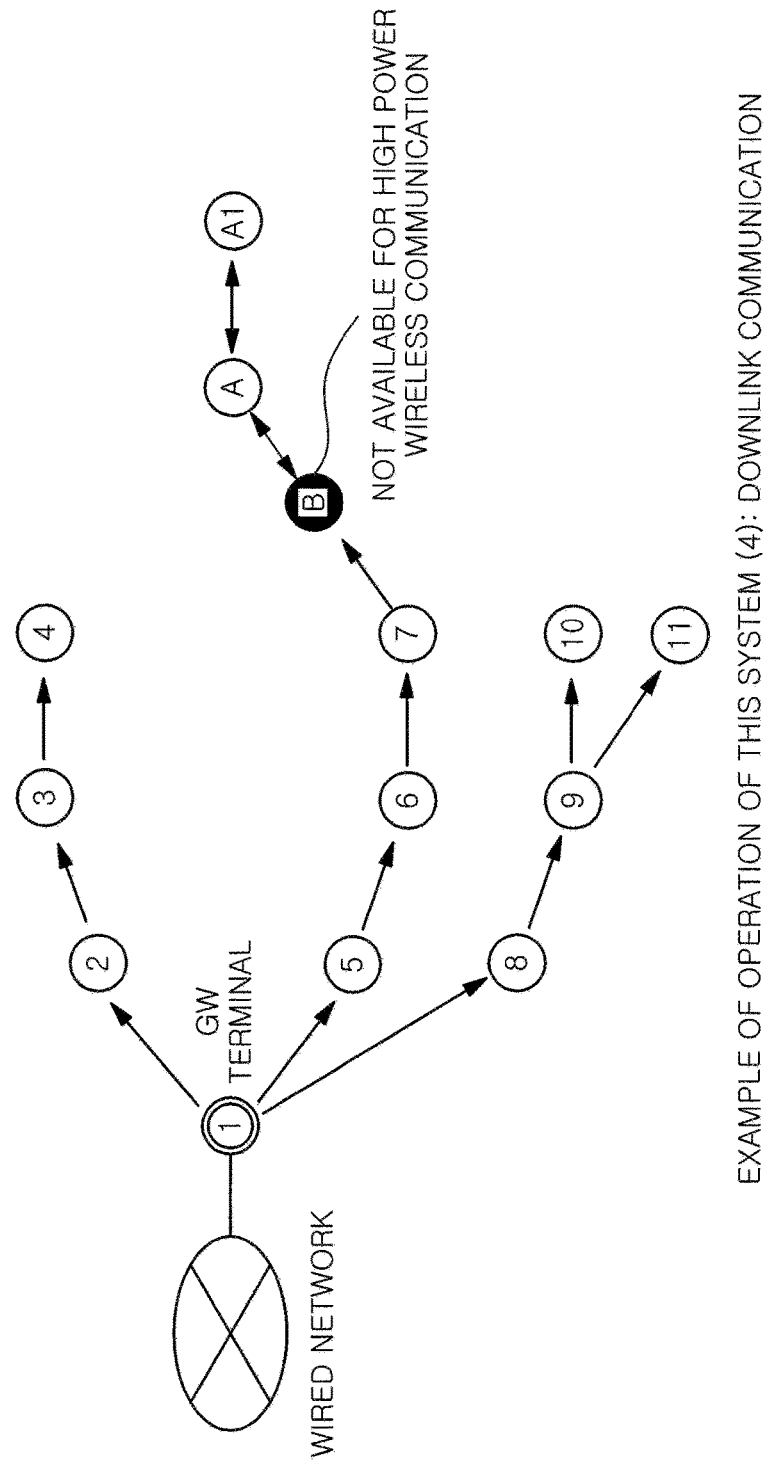
FIG. 8 is a schematic explanatory view showing downlink communication of a fourth example of operation of this system.
Figure 9:
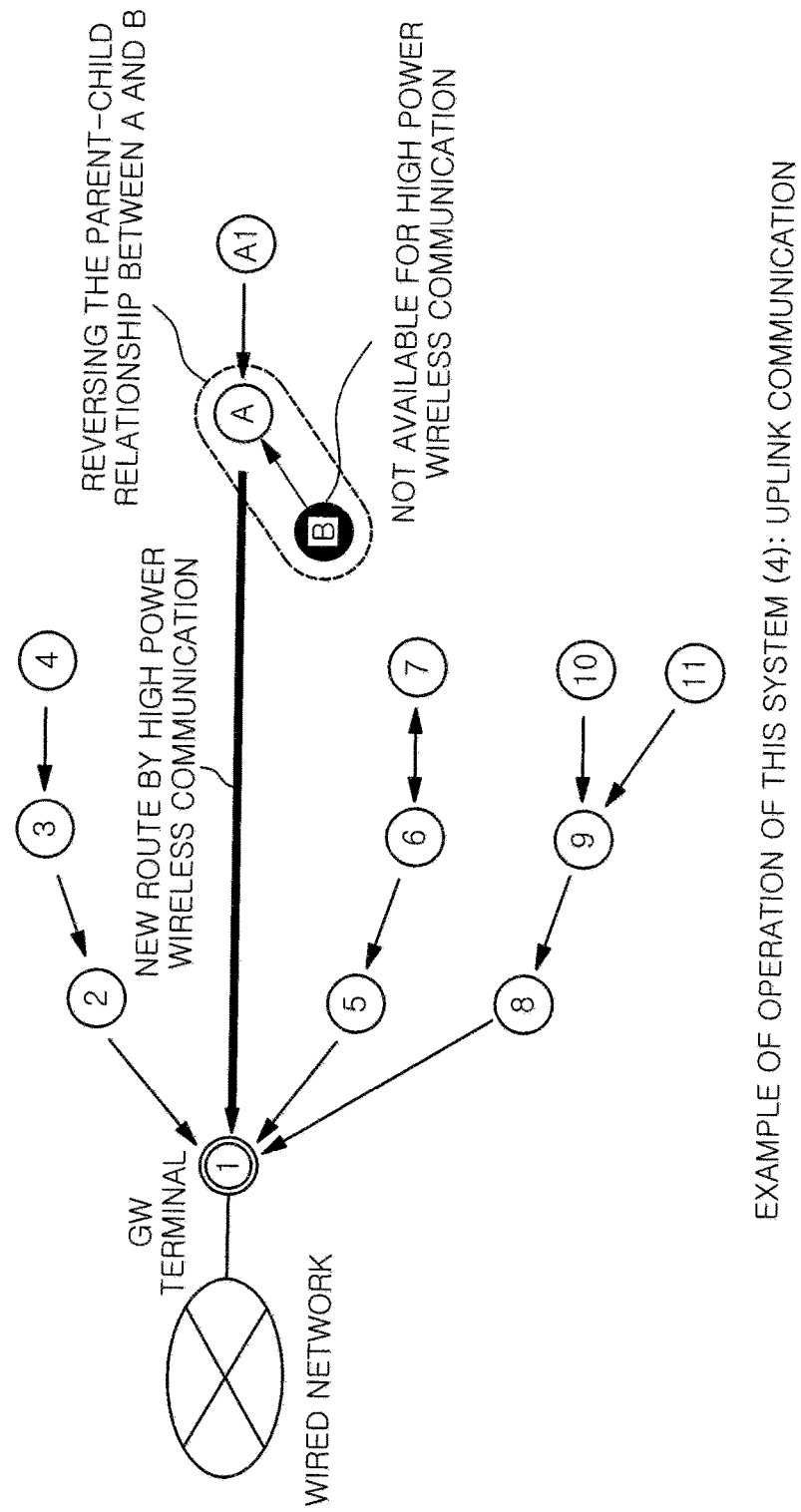
FIG. 9 is a schematic explanatory view showing uplink communication of the fourth example of operation of this system.

[Fourth Example of Operation of this System: FIGS. 8 and 9]

Next, a fourth example of operation of this system will be described with reference to FIGS. 8 and 9. FIGS. 8 and 9 are respectively schematic explanatory view showing downlink communication and uplink communication in the fourth example of operation of this system.

The above-described first to third examples of operation show the bidirectional communication route and use the same route in the uplink and downlink. However, if a chance of wireless communication at the high power mode is increased, there occurs a possibility of interference in different sensor terminals in the same network or interference in adjacent networks.

Accordingly, in the fourth example of operation, in order to make the number of times of communication at the high power mode as small as possible, different routes between the downlink and the uplink are constructed according to constraints on delay time.

FIGS. 8 and 9 show a network configuration in the sensor terminals as shown in FIG. 7, in which node B is a sensor terminal not available for high power and node A is a sensor terminal available for high power.

In general, in communication of downlink from the GW terminal to a sensor terminal, constraints on delay are not strict since control information or the like is transmitted. Accordingly, it is considered that increase in the number of hops has little effect on the downlink communication.

Accordingly, as shown in FIG. 8, in the downlink communication, a route including node B serving as a sensor terminal not available for high power becomes the route of GW terminal→node 5→node 7→node B→node A→node A1 in the low power mode.

Thus, in the downlink communication where a certain degree of delay is acceptable, data are transmitted in a low power multi-hop communication without using a high power communication.

On the other hand, in the uplink communication, there are many cases where delay is strictly constrained since data sensed by a sensor terminal are transmitted.

Accordingly, as shown in FIG. 9, in the uplink communication, node A is switched to the high power mode and a route with node B as a subordinate of node A is reconstructed.

Accordingly, node B, node A and node A1 can be connected to the GW terminal in one hop or two hops, thereby decreasing delay time.

[Example of Routing Table of GW Terminal: FIG. 10]

Next, an example of the routing table stored in the route managing unit 42 of the GW terminal will be described with reference to FIG. 10, which is an explanatory view showing an example of the routing table of the GW terminal.

As shown in FIG. 10, the routing table of the GW terminal is provided to manage routes related to all sensor terminals subordinate to the GW terminal and stores a parent node, the number of child nodes, whether or not available for high power, power mode and the number of hops in association with node ID in the form of a matrix.

The routing table of FIG. 10 is a table corresponding to the network topology of FIG. 7.

The node ID is identification information of a sensor terminal joining the network.

The parent node is an upper node directly connected to the corresponding node.

The number of child nodes is the number of lower nodes directly or indirectly connected to the corresponding node.

Whether or not available for high power is information indicating whether or not a sensor terminal of a corresponding node is capable of communication at the high power mode. This information is transmitted while being attached to a join request when the sensor terminal joins the network. This information may be acquired by the GW terminal, or alternatively, may be acquired by the GW terminal inquiring of each of the sensor terminal about this information as described in the third example of operation.

The number of hops refers to the number of hops from the GW terminal to the corresponding node.

In the example of FIG. 10, for example, since node A is switched to the high power mode and is conducting direct communication with the GW terminal (node 1), "patent node" is GW terminal, "the number of child nodes" is 2 since node A1 and node B as child nodes are connected to node A, "whether or not available for high power" is available (marked as "0" in FIG. 10) and "the number of hops" is 1.

For node B, "patent node" is node A, "the number of child nodes" is 0, "whether or not available for high power" is not available (marked as "X" in FIG. 10) and "the number of hops" is 2.

[Routing Table of Sensor Terminal: FIG. 11]

Next, an example of a routing table of a sensor terminal will be described with reference to FIG. 11, which is an explanatory view showing an example of the routing table of the sensor terminal.

The example of FIG. 11 shows a routing table of node A in the network topology shown in FIG. 6.

As shown in FIG. 11, a destination, the next node mode corresponding thereto and a power are stored in the routing table of the sensor terminal.

In the routing table of node A in the network topology of FIG. 6, for the uplink direction, the reception destination is GW terminal (node 1), the next node corresponding thereto is GW terminal, and the power mode is the high power mode.

That is, direct connection to and direct communication with the GW terminal in the high power mode is stored in node A.

For the downlink direction, next nodes are respectively stored to correspond to destinations, i.e., lower nodes A1 to A5 of node A, and the low power mode is stored as the power mode.

In this routing table, node A1 and node A3 are directly connected to node A, node 2 lies on a route passing through node A1, node A4 and node 5 lie on a route passing through node A3, and the lower power mode is stored for all downlink communications of node A.

Figure 12:
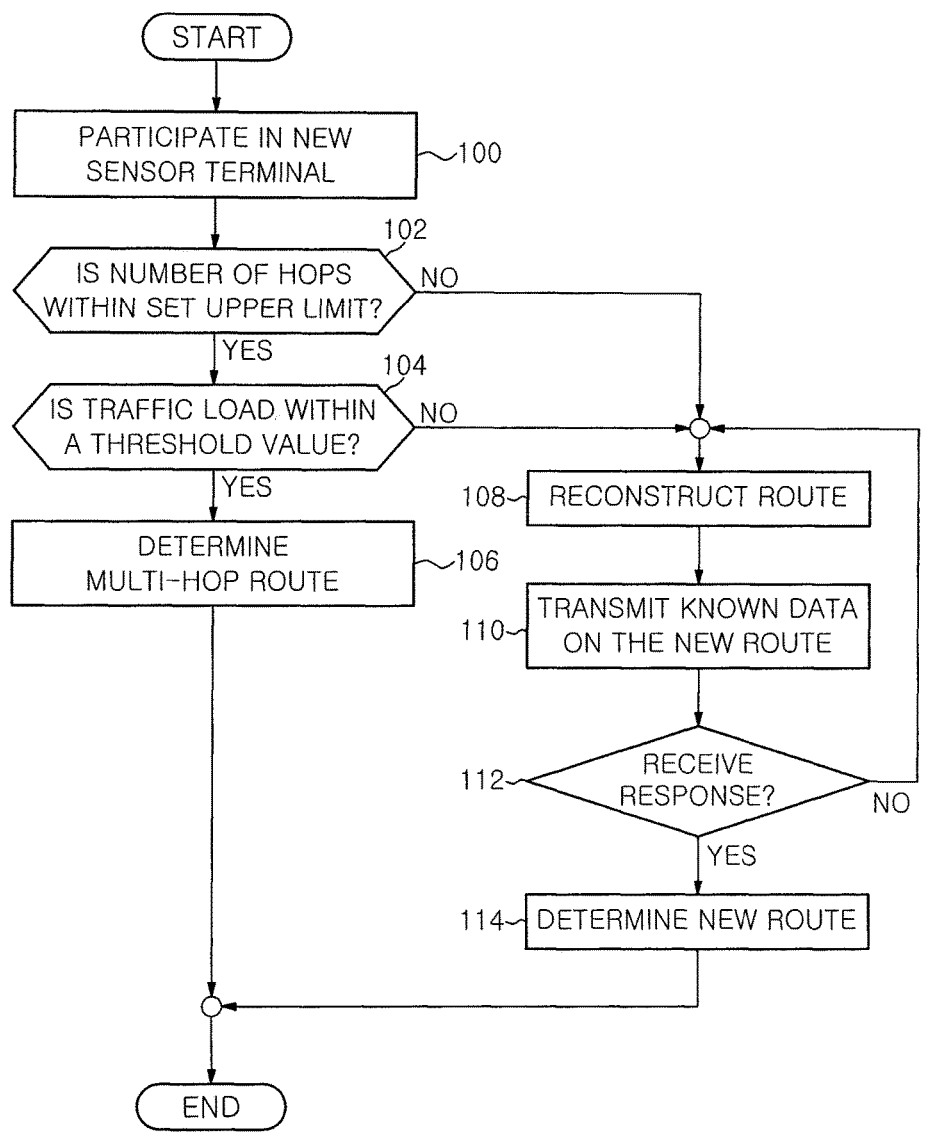
FIG. 12 is a flow chart showing processing in a GW terminal when a sensor terminal participates in a network.

[Processing of GW Terminal: FIG. 12]

Next, processing in the controller of the GW terminal when a new sensor terminal participates in the network will be described with reference to FIG. 12, which is a flow chart showing processing in the GW terminal when the new sensor terminal participates in the network.

As shown in FIG. 12, the controller of the GW terminal (hereinafter abbreviated as "GW terminal") receives a network join request from a new sensor terminal, and, when the new sensor terminal participate in the network (Step 100), obtains the number of hops of the sensor terminal based on route information attached to the received join request and a stored routing table, and determines whether or not the obtained number of hops is within the set upper limit (Step 102).

If the number of hops is within the set upper limit (Yes in Step 102), the GW terminal calculates a traffic load of a node on a route of the new sensor terminal and determines whether or not the traffic load is within a threshold value (Step 104). If the traffic load is within the threshold value (Yes in Step 104), the GW terminal determines a corresponding multi-hop route and stores it in the routing table (Step 106).

If the number of hops of the new sensor terminal exceeds the upper limit (No in Step 102) or if the traffic load exceeds the threshold value (No in Step 104), the GW terminal reconstructs a route as shown in the above examples of operation (Step 108).

Then, when a new route is constructed, the GW terminal uses the new route to transmit known data to a sensor terminal on the new route (Step 110).

When a response indicative of normal reception of the data is received from the sensor terminal of a transmission destination, the GW terminal determines the new route and updates the routing table (Step 114).

Thus, the processing in the GW terminal of this system is performed.

[Effects of Embodiments]

The wireless sensor network system according to the embodiments of the present invention includes a GW terminal and a plurality of sensor terminals directly or indirectly connected to the GW terminal, wherein each of the sensor terminals has a low power mode having lower transmission power and a high power mode having higher transmission power than the low power mode. An additional sensor terminal is connected to an adjacent sensor terminal in the low power mode at the time of network join, and uses an existing multi-hop route to access the GW terminal. The GW terminal calculates the number of hops of the additional sensor terminal in the multi-hop route and a traffic load of a node on a corresponding route, determines the multi-hop route as a route of the additional sensor terminal if both the number of hops and the traffic load are within their respective preset upper limits, switches the additional sensor terminal to the high power mode if at least one of the number of hops and the traffic load exceeds the upper limit, and reconstructs a route by outputting an instruction to instruct the additional sensor terminal to conduct direct communication with the GW terminal. This system has an advantage of prevention of data transfer delay due to increase in the number of hops and concentration of a load on a specific node, prevention of increase in the traffic amount of the entire network, and efficient operation of the system.

In addition, this system has another advantage of more efficient operation of the entire system since the GW terminal can designate an access destination of a terminal switched to the high power mode as a terminal having a low traffic load without limiting the access destination to the GW terminal.

In addition, in a case where a node intended to be switched to the high power mode is a sensor terminal not available for high power when reconstructing the route, the GW terminal switches a sensor terminal available for the high power mode, which is a lower node of the intended node, to the high power mode and reconstructs a route to allow the corresponding sensor terminal to conduct direct communication with the GW terminal. Accordingly, this system has advantage of increase in a degree of freedom of route construction, prevention of data transfer delay due to increase in the number of hops, prevention of concentration of a load on a specific load, and efficient operation of the system since.

In addition, communication is conducted using a multi-hop route for downlink communication from the GW terminal to the sensor terminal and some sensor terminals are switched to the high power mode to reduce the number of hops for uplink communication. Accordingly, this system has advantage of suppression of power consumption and interference to the minimum with a route having the number of hops changed in the uplink and downlink depending on acceptable delay time so as not to conduct high power communication if possible.

In addition, a sensor terminal stores a power mode for each destination and can accordingly conduct ad-hoc communication with lower nodes in the lower power mode even in case when the sensor terminal conducts communication with the GW terminal in the high power mode. Accordingly, the system has another advantage of suppression of interference to the minimum without increase in wasteful power consumption. A sensor terminal stores a power mode for each destination and can accordingly conduct ad-hoc communication with lower nodes in the lower power mode even in case when the sensor terminal conducts communication with the GW terminal in the high power mode.

Although it has been illustrated in the above examples that the power mode includes two modes, i.e., the high power mode and the low power mode, transmission power may be set depending on a distance from a designated access destination if a position of a sensor terminal is known, or alternatively, the transmission power may be raised little by little to set transmission power at which normal data exchange with the access destination is possible.

INDUSTRIAL APPLICABILITY

The present invention is suitable for a wireless sensor network system which is capable of reducing delay time by preventing increase in a traffic amount of an overall system and capable of efficiently operating the system by preventing concentration of a traffic load on a specified terminal.

DESCRIPTION OF REFERENCE NUMERALS 1 sensor
2, 4 controller
3, 6 wireless communication unit
7 wired communication processor
21, 41 application managing unit
22, 42 route managing unit
23, 51 wireless communication access control unit
24, 52 wireless communication interface unit
71 wired communication access control unit
72 wired communication interface unit

What is claimed is:

1. A sensor terminal which constitutes nodes of a wireless sensor network system together with a management terminal and conducts wireless communication based on an instruction from the management terminal,
wherein the sensor terminal transmits a join request to the management terminal at a first transmission power via an existing node when the sensor terminal participates in the network, and, upon receiving the instruction to make direct connection to the management terminal or a specific node having a low traffic load at a second transmission power higher than the first transmission power from the management terminal, the sensor terminal transmits data to the management terminal or the specific node at the second transmission power, and wherein, if the sensor terminal is not available for the second transmission power, the sensor terminal connects to another sensor terminal available for the second transmission power as subordinate thereof, at the first transmission power based on an instruction from the management terminal.

2. The sensor terminal of claim 1, wherein the sensor terminal communicates at the first transmission power for downlink communication from the management terminal to the sensor terminal, and the sensor terminal communicating at the second transmission power transmits data to the management terminal or the specific node at the second transmission power for uplink communication from the sensor terminal to the management terminal.

3. The sensor terminal of claim 1, wherein the sensor terminal stores routing information including destination information as a destination of a packet, next node information as a transmission destination of the packet, and power mode information of either of the first transmission power or the second transmission power which are associated with one another, and conducts communication based on the routing information.

* * * * *